Dec. 17, 1946.  R. A. OWENS  2,412,831
PENDULUM VERTICAL ANGLE MEASURING INSTRUMENT
Filed March 19, 1941  2 Sheets-Sheet 1

INVENTOR
Roy A. Owens
BY
ATTORNEY

Dec. 17, 1946.  R. A. OWENS  2,412,831
PENDULUM VERTICAL ANGLE MEASURING INSTRUMENT
Filed March 19, 1941  2 Sheets-Sheet 2
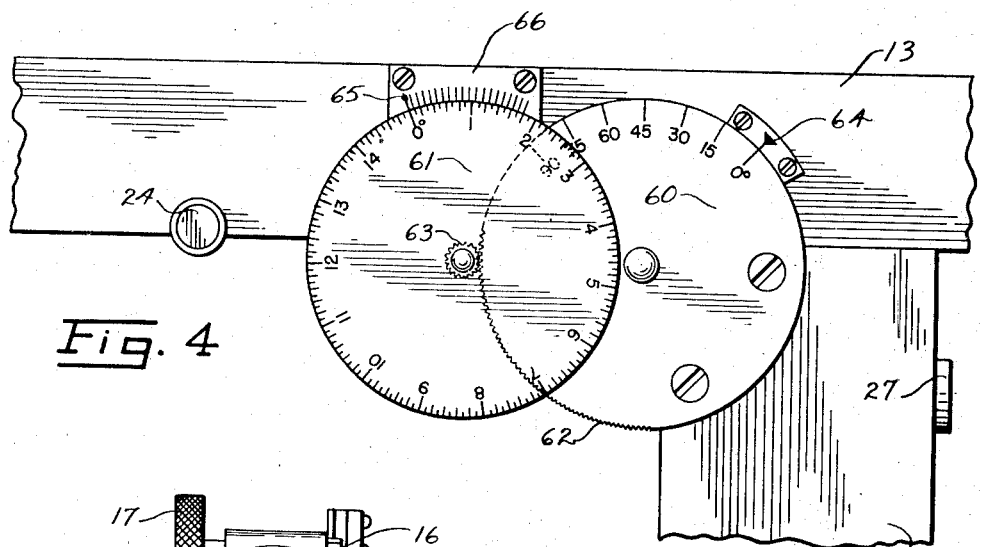
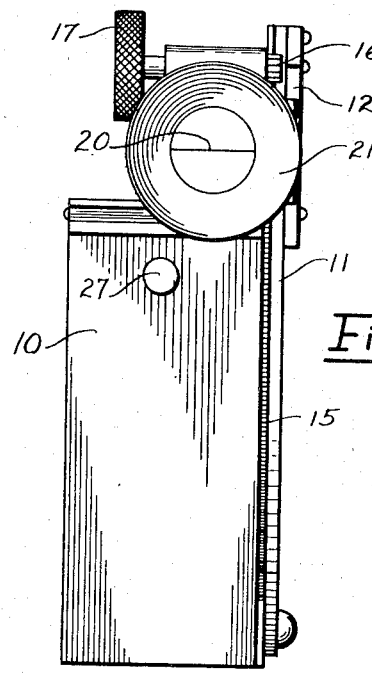
INVENTOR
Roy A. Owens
BY
ATTORNEY Patented Dec. 17, 1946

2,412,831

UNITED STATES PATENT OFFICE 2,412,831

PENDULUM VERTICAL ANGLE MEASURING INSTRUMENT

Roy A. Owens, Galveston, Tex.

Application March 19, 1941, Serial No. 384,161

12 Claims. (Cl. 33—70)

This invention relates to a geometrical instrument for measuring the vertical angle of a body in space, and has particular reference to an observational instrument for measuring the altitude of a selected celestial body. The instrument may take the form of either a sextant, an octant, a quadrant, or similar device and is used in a substantially similar manner.

It is an object of this invention to provide an observation instrument for measuring the altitude of a celestial body at night or during periods of reduced visibility.

It is a further object of my invention to provide an observation instrument for measuring the vertical angle between the line of sight to the selected celestial body and an observer's horizon by considering the angular relationship between said line of sight and a perpendicular to the celestial horizon.

It is another object of this invention to provide an instrument which measures the altitude angle of a celestial body by direct observation.

It is a further object of this invention to provide an observation instrument for measuring the angle of a celestial body relative to an imaginary horizon determined and established by the instrument's angular position relative to a perpendicular established by a pendulum or other pivotally mounted and gravitationally influenced body.

It is also an object to provide an observation instrument by which the altitude angle of a celestial body is determined by reference to a perpendicular established by a gravitational pendulum, with apparatus for indicating to the operator the proper position of the instrument relative to the perpendicular established by said pendulum or other pivotally mounted and gravitationally influenced body for correct observation.

It is a still further object of my invention to provide a vertical angle determining instrument wherein means is provided for determining the line of sight to an object in space, and wherein the angular position of the instrument in space relative to a perpendicular determines the line of the observer's horizon, with means for indicating to the operator the correct position of the instrument relative to said perpendicular established by a gravitational pendulum.

In many of the prior art sextants the image of the selected celestial body is observed in an index or horizon mirror and the operator frequently has difficulty in bringing the image of the celestial body down to the plane of the horizon, particularly where the selected celestial body is a star of the third magnitude. In order to obviate this difficulty navigators frequently invert the sextant so as to observe the star directly in the telescope and then by means of the index mirror bring the horizon up to the star to measure its altitude; irrespective of the fact that the sextant is not so easily managed in this position. With my invention measurements by direct observations may be quickly and easily effected by any person who has had but little experience or training, because the operation of my instrument does not require the skill and training heretofore necessary for the accurate manipulation of the prior art sextants which this instrument is designed to replace.

In addition to the disadvantage, as set out above, the majority of the prior art sextants are particularly unsuited for observing faint stars which may be ideally located for navigational purposes. The reason these prior art sextants are unsuited for this purpose is due to the inefficiency of their optical system. The image of the selected body must be observed in the horizon and index mirrors, and as is well known only a fraction of the amount of light falling upon the surface of a mirror is reflected, the amount of light reflected being dependent upon the refractive index of the mirror surface and the angle of incidence of the light. Thus, under certain conditions, a large percentage of the light is diffused or absorbed, and the image of the reflected celestial object is not sufficiently luminous or vivid for observation. By means of my invention, however, the celestial body is observed directly in the telescope, or in the eye-piece if no telescope is used, so that its brilliance is not appreciably reduced by the optical system, and other disadvantages accompanying the use of the mirrors are not therefore present.

Furthermore, the telescopes provided with the prior art sextants are not the best aavilable because the size of the telescope is limited by the structure of these prior art sextants. In my invention, however, a more powerful and more efficient type of telescope may be used, whereby stars which were heretofore considered too faint for navigational purposes, but otherwise ideally located, may now be observed in my sextant and their altitude accurately determined.

A number of observational instruments have been developed for measuring the altitude angle of a celestial body at night or during periods of low visibility, but these instruments rely upon the formation of some artificial horizon by means of a bubble cell or the like, and also usually provide some means for illuminating the artificial horizon, so that observational measurements may be made at night. The skillful use of these prior art bubble sextants can be acquired only after considerable practice and experience, and the time required to make a celestial observation, even by the most experienced operator, is often much greater than that required through the use of my invention, which is designed to overcome many of the disadvantages of the prior art bubble sextants.

It is, therefore, a specific object of my invention to provide an instrument in the nature of a sextant, quadrant or the like which may be used to obtain the angle between the horizon and any celestial body which is visible in the telescope, quickly, accurately, and at any time regardless of the visibility of the horizon and without the inherent disadvantages of the prior art bubble sextants, quadrants or the like.

With the foregoing and other objects in view, the invention consists in the construction, combination and arrangement of parts hereinafter described and illustrated in the drawings, in which, Fig. 1 is a side elevational view showing the observational instrument in its zero altitude position;

Fig. 4 is an elevational view showing a modification of my invention; and

Fig. 5 is an end view of Fig. 4.

Figure 1:
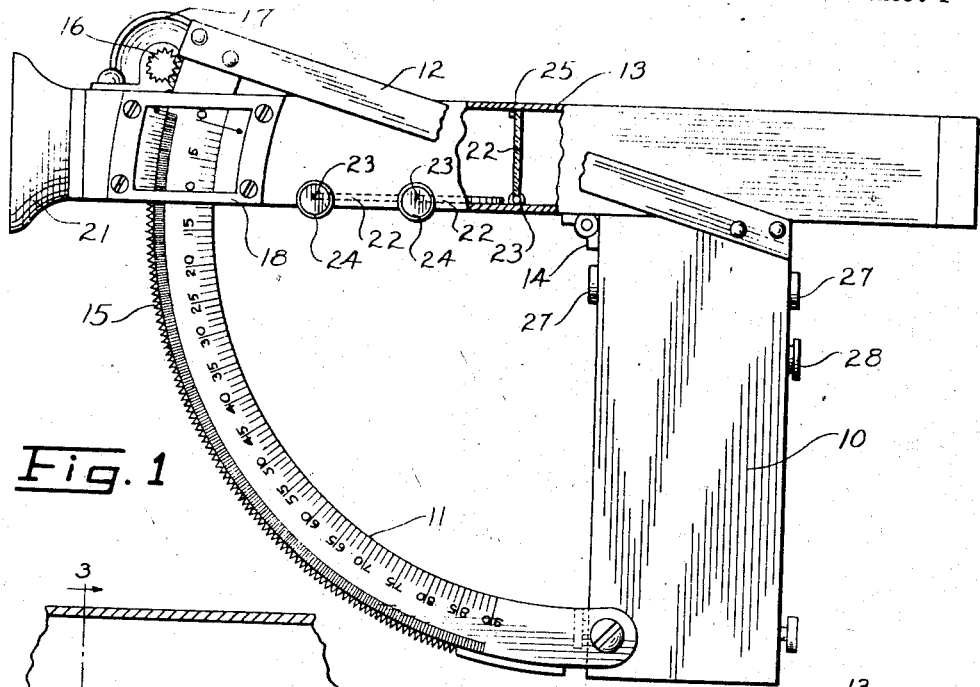
Figure 3:
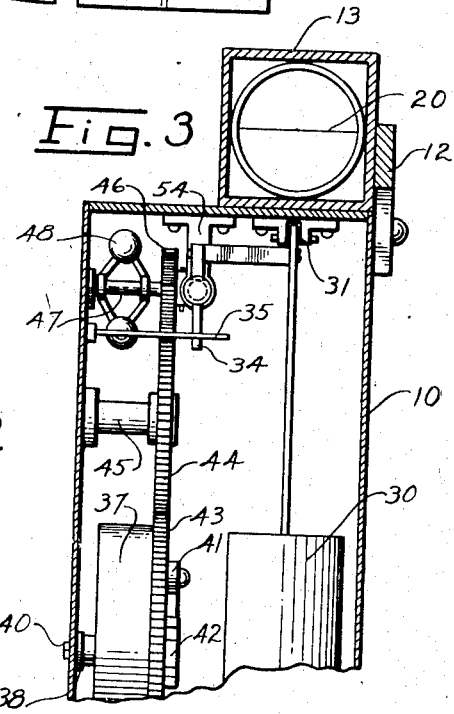
Fig. 3 is a side view taken on line 3—3 of Fig. 2.

Referring now to the drawings:

Fig. 1 shows the instrument in its zero altitude position, that is, the position at which the horizontal index 20, Fig. 3, parallels the celestial horizon. The handle of the instrument is indicated generally at 10. One end of an arc 11 is secured directly to this handle while the other end of the arc 11 is fixed to an end of a supporting bracket 12. This bracket 12 is also secured to an end of the handle opposite the end to which the arc is secured to as to form a support for the arc 11 at both of its ends. A telescope body 13 is pivoted to this assembly comprising the handle, the arc and the supporting bracket, so that the angular position of the telescope relative to the supporting structure may be adjusted, and the said angular position indicated by suitable calibrations on the arc.

The supporting body of the telescope is of rectangular cross-section in the specific illustrated embodiment to provide a flat surface to which the handle assembly may be pivoted. The pivotal connection, as illustrated, is in the form of a hinge indicated at 14, although obviously any other suitable type of pivotal connection may be used. As a matter of convenience I have illustrated an arc of a length equal to 90°, although an arc of less than 90° would be sufficient to measure the altitude of the celestial bodies most frequently used for navigational purposes. This arc 11 carries on its outer periphery a toothed rack 15 with which a pinion gear 16 is in driving engagement to provide for delicate precise adjustment of the angular position of said telescope and supporting structure. The knurled operating thumb wheel 17 is provided to facilitate adjustment of the telescope by means of the rack 15 and pinion 16.

A framed arc guide 18 is secured to the body of the telescope and is provided with an index and suitable vernier calibration common in the art. The arc 11 is engraved with applicable calibrations and the guide 18 has an open window or frame through which these calibrations may be read. The position of the arc relative to the telescope, as shown in Fig. 1, indicates the position of zero altitude and the arc is calibrated so that the altitude angle may be read directly from the arc. That is, correctly speaking, the angle actually measured by the instrument is the angle less than 90° between the line of sight of the telescope and a perpendicular established by a gravitational pendulum. However, the arc is calibrated so that the complement of this angle may be read directly upon the arc, which angle measures the observed altitude of the celestial body relative to a horizon at the observer's height of eye.

The telescope per se forms no part of my invention except as modified for use with the instrument. For example, as illustrated, the supporting body of the telescope is of a rectangular cross-section and has an appropriate horizontal index 20 at the ends of the telescope, as indicated in Fig. 3. The eyepiece 21 carries an adjustable focusing lens usually provided in this type of telescope, the remaining portions of which have the usual telescopic lens arrangement. Standard types of navigators' sextants are usually equipped with colored glass filters which may be interposed between the eye of the observer and the celestial object under observation. I have modified the telescope construction by mounting along the body of the telescope several of such filters as indicated at 22. Each of these filters is pivotally secured to the body portion of the telescope, as indicated at 23, and has an operating knob 24 secured to each filter at its pivot so that it may be rotated about said pivot to bring it ino the line of sight. Stops 25 are provided for each of the filter glasses to hold the filter glass in the upright position, as indicated in Fig. 1. The advantage of this construction over the prior art resides in the fact that the filters are enclosed within the body of the telescope and are not exposed to grime, dirt, or any marring which would tend to obstruct the passage of light therethrough, tending to distort the observed object or image or render it less distinct. Furthermore, these filters are not as easily damaged as are the exposed filters of the prior art sextants.

For a more complete understanding of my invention, the operating mechanism which is mounted within the handle and serves to indicate the proper position of the handle relative to the telescope for correct observation will now be described. As shown in Fig. 1, the handle is provided with a button 28 which is pressed inwardly by the operator as the handle is gripped. This button controls the release of an operating mechanism positioned within the handle, which mechanism will cause at least one or the other of the two remaining buttons 27 to vibrate if the handle is not held in the proper position for correct observation. In the illustrated embodiment the handle is always moved away from the vibrating button to properly position the same.

Figure 2:
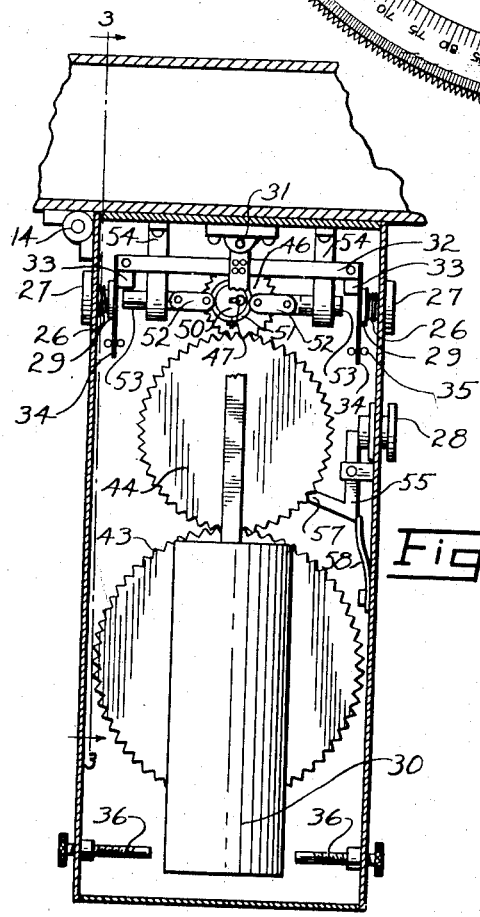
Fig. 2 is an exposed elevational view of the operating mechanism in the handle of Fig. 1.

The operating mechanism within each handle is shown in Figs. 2 and 3, and comprises a gravitational pendulum 30, pivotally supported in the handle at 31. This pendulum is provided to establish a true perpendicular relative to the observer's horizon and carries at its pivoted end a rocker arm 32 which also has pivotally secured at each end thereof the vibration transmitting wedge members 33. Movement of both the wedging members 33 is restricted to a straight line path by means of the leaf spring 34 secured thereto and the guides for the leaf springs formed by the pins 35. Adjustable stops 36 are provided at each side of the pendulum so that the angle of swing of the pendulum may be adjusted. These vibratory buttons 27 are supported in the walls forming the handle so that each may have a limited movement laterally of the handle and are each provided with a coil spring 26 which surrounds the extending shank of the button and is positioned between the surface of the inner wall of the handle and a flange 29 formed on the button's shank at its inner end, so as to hold the button inwardly to the limit of its movement.

Now, as the handle is gripped by the operator, the buttons 27 are usually positioned between the forefinger and thumb of the operator's hand so that the vibrations transmitted to either of these buttons by a mechanism to be described may be readily detected.

The vibration transmitting apparatus comprises a simple spring driven mechanism which includes a main spring casing 37 secured to a driveshaft 40, rotatably supported in a bearing 38 and extending outwardly of the handle through an opening provided therein to form a winding spindle, as illustrated in Fig. 3. The end of this shaft is constructed so that a winding key may be inserted into the opening of the handle to engage the shaft to "wind up" the spring secured thereto. For the sake of clarity of the drawing, this spring is not shown; however, one end of the coil spring is secured to the driveshaft and the other end is secured to either the handle or the shaft supporting structure comprising the bearing 38. A ratcheting mechanism is provided so that the spring will not immediately uncoil without driving the shaft. I have shown in Fig. 3 a detent 41 and ratchet wheel 42 for accomplishing this purpose. The spring and winding mechanism is not illustrated with any degree of particularity because the operation of the type of spring motor is well known, and furthermore, because I do not propose to be limited to any particular illustrated arrangement. The main casing 37 which is secured to the spring driven shaft 40 has a geared flange 43 formed thereon which meshes with the gear 44 rotatably supported in the bearing 45. This gear in turn meshes with the small gear wheel 46 secured to the shaft 47 which is rotatably supported at each end thereof. A governor, indicated generally at 48, is provided on this shaft to limit the speed of rotation thereof. The rotary movement of the shaft 47 is converted into a reciprocatory or vibratory movement by means of the eccentric 50 to which the shaft is keyed.

A collar 51 is positioned about the eccentric so that the eccentric may rotate freely therein and the lateral movement thereof may be transmitted to the connecting rods 52 connected thereto. The connecting rods are each pivotally secured to the vibration transmitting rods 53, the movement of which is restricted to a straight line path by the guides 54.

The release or stop mechanism is illustrated in Fig. 2, and comprises a centrally pivoted lever 55, one end of which is provided with a detent 57, the other end of which engages the inner end of the release button 28. This button 28 is supported in the handle so as to have a lateral movement with respect thereto similar to the vibratory buttons 27. The leaf spring 58 resiliently holds the lever in the position illustrated, wherein the detent 57 engages the teeth of the gear wheel 44 and the button 28 is pushed outwardly of the handle. As the button 28 is pressed inwardly by the operator the detent 57 disengages the toothed gear wheel 44 and permits it to rotate, driving the gear 46 and shaft 47.

A further embodiment of my invention is illustrated by Figs. 4 and 5. In this modification the angular position of the telescope relative to the handle is indicated on the dials 60 and 61. The dial 60 is geared over a portion of its periphery at 62 so as to engage the pinion 63, which is drivingly secured to the dial 61. In the illustrated embodiment dial 60 is shown calibrated in steps of fifteen degrees from zero to ninety degrees, while dial 61 is calibrated from zero to fifteen degrees and fractions thereof. A suitable vernier 66 is also provided to accurately indicate the fractions of the divisions of the calibrations on the dial 61. The indexes 64 and 65 are provided to indicate the proper reading of each dial.

In other respects, the operating mechanism of this modification is identical with that illustrated in Figs. 1 to 3, and similar reference numerals are used to indicate corresponding parts.

I wish it to be understood that I do not intend to be limited to the particular structural arrangements herein set forth, for while I have illustrated mechanical means only for indicating to the operator the proper position of the handle for correct observation, this is because it is the preferred form of my invention, notwithstanding the fact that I recognize that electrically actuated signalling means may be provided.

The operation of my device is as follows:

The operator takes the instrument with the handle and the telescope in the position indicated in Fig. 1. The operator then points the telescope directly toward the selected celestial body so as to center the body in the telescope by means of the horizontal reference line 20. If the selected celestial body has a visible disc the telescope is positioned so that the transverse line 20 is tangent to either the upper or lower limb of the selected celestial body. While holding the telescope in this position with one hand the pinion gear 16 is moved by the adjustment wheel 17 to provide for accurate final adjustment as the altitude of the body changes.

Whenever the handle is moved out of its exact vertical position one of the vibration transmitting wedging members 33 will be moved into a position between the vibration transmitting rod 53 and the button 27 so that the movement of the rod 53 is transmitted directly to either of the buttons, depending upon the position of the handle. That is, the handle is always moved away from the vibrating button. The pendulum 30 establishes the perpendicular reference line and when the handle is held so that its axis is parallel to or coincides with this line, both of the vibration transmitting wedges are held above the space between the vibrating rods 53 and the buttons 27. In this position the vibration or movement of the rods will not be transmitted to the buttons, and by this means the operator can determine the proper position of the handle for correct observational measurement of the selected celestial bodies' altitude.

Other modifications and changes in the number and arrangement of the parts may be made by those skilled in the art without departing from the nature of this invention, within the scope of what is hereinafter claimed.

I claim:

1. A vertical angle determining instrument including a frame comprising an arc bar having degrees marked thereon, and a handle therefor, means for directly observing a selected celestial body to determine the line of sight to said body, said means being adjustably supported on said frame so that its angular position relative thereto may be indicated on said arc, means for obtaining a delicate precise adjustment of the position of said first named means on said arc, a gravitational pendulum pivoted to said frame for establishing a perpendicular, and signal means controlled by relative angular relation of said pendulum and frame for indicating the proper horizontal position of said frame relative to the perpendicular established by said pendulum whereby the angle indicated on said arc will be the observed altitude of the celestial body at the observer's height of eye.

2. The invention defined by claim 1 wherein said first named means comprises a telescope and said signal means comprises a vibrator positioned in the handle of said instrument, with additional means responsive to the relative position of the pendulum and handle whereby vibrations produced by said vibrator will be transmitted to said handle when the vertical axis of said handle is not parallel to or coincident with the perpendicular established by said first named means, whereby the operator when holding said handle will as a result of said vibrations be advised of the relative position of said pendulum and said handle.

3. An observational instrument for measuring the vertical angle of an object in space relative to the observer's horizon comprising a supporting member for establishing a horizontal reference line, means for establishing the line of sight to said object by direct observation, means securing the supporting member to said means so that the vertical angle between said means and said supporting member may be adjusted, means for indicating the vertical angle between a reference line established by said supporting member and the line established by said first named means, a gravitationally influenced body pivoted to said support member for establishing a vertical reference, and signal means controlled by relative angular relation of said gravitationally influenced body and said supporting member for indicating to the operator the correct position in which the supporting member must be held relative to said vertical established by said gravitationally influenced body so that the angle indicating means will give the observed vertical angle of the object with reference to the horizon at the observer's height of eye when the line of sight has been established by said first named means.

4. The invention as defined by claim 3 wherein said last named means comprises a vibrator, means for transmitting the vibrations thereof to said operator for indicating the direction in which the support member must be moved to bring its horizontal reference line into the position for correct observation.

5. An observational instrument for measuring the altitude angle of a selected celestial body comprising means for directly observing the said celestial body to establish the line of sight to said body, an angle measuring arc having an indicating scale thereon, means for pivotally securing said first named means to said angle measuring arc to indicate thereon the angular position of said first named means, means comprising a gravitational pendulum movable relative to said arc for establishing a perpendicular, signal means controlled by relative angular relation of said pendulum and angle measuring arc for determining the proper position of said measuring arc relative to said perpendicular so that the angular position of said first named means as indicated on said scale will be the observed altitude of the selected celestial body at the observer's height of eye.

6. The invention as defined by claim 5, wherein said last named means comprises a vibrator, and means for transmitting the vibrations thereof to the operator when the arc is in an improper position relative to said pendulum for correct observation.

7. An observational instrument for measuring the altitude of a selected celestial body comprising means for directly observing the said celestial body to establish a line of sight to said body, a supporting handle secured to said means so as to have movement relative thereto, said handle having a gravitationally influenced body pivotally supported therein for establishing a perpendicular relative to the observer's horizon, means for producing touch detectable vibrations controlled by the relative angular relation of said handle and pivoted body for indicating the correct angular position of said handle relative to said perpendicular, and means for accurately measuring the angle between a zero reference line carried by said handle and the line of sight established by said first named means.

8. The invention as defined in claim 7 characterized by the fact that said touch detectable vibration producing means comprises two buttons supported by said handle on opposite sides of its longitudinal axis so as to be movable transversely thereof in a path parallel to the plane of movement between said handle and said first named means, a vibrator positioned in said handle, means controlled by the relative tilt from a predetermined relation between said handle and pivoted body for transmitting vibrations to one of said buttons when the longitudinal axis of said handle falls on one side of the perpendicular established by said body, and means for transmitting vibrations to the other of said buttons when the longitudinal axis of said handle falls on the opposite side of the perpendicular established by said pivotal body whereby the vibrating button will be tactilely detected by the operator to indicate the direction said handle must be moved to bring its longitudinal axis into its proper position relative to the perpendcular for correct observational measurement of the altitude of the selected celestial body.

9. An observational instrument for measuring the vertical angle of an object in space relative to an observer's horizon comprising means for directly observing the said celestial body to establish a line of sight to said body, a supporting member having a longitudinal axis pivotally secured to said means so that its longitudinal axis lies in a vertical plane containing said line of sight, a gravitational pendulum pivoted thereto for establishing a perpendicular relative to the observer's horizon, signaling means controlled by relative angular relation of said pendulum and supporting member for indicating the correct position of said pendulum relative to said longitudinal axis of said supporting member, and means for measuring the angle between a zero reference mark formed on said supporting member and said first named means.

10. A device as per claim 9, said signaling means comprising a pair of vibratable members positioned to be contacted by the operator, vibrating mechanism and means controlled by relative tilt from a predetermined relation between said supporting member and said pendulum to transmit vibrations from said mechanism to a corresponding one of said vibratable members, depending upon the direction of relative tilt.

11. An instrument for measuring the vertical angle of an object in space relative to a plane parallel to the observer's horizon, comprising an optical system, a supporting structure therefor having an angle measuring means secured thereto for measuring the angle between the object observed in said system and a zero reference on said means, a gravitationally influenced body pivoted to said supporting structure, signaling means comprising a pair of vibratable members positioned to be contacted by the observer, and means controlled by the tilt of said supporting structure relative to said gravitationally influenced body for causing a corresponding one of said members to be vibrated, depending upon which side of said plane said zero reference happens to be located.

12. In an instrument having an optical system for obtaining an observational measurement of the vertical angle of an object in space relative to a plane parallel to the horizon, a frame forming a supporting structure for said optical system, said frame being provided with an arc bar having degrees marked thereon, a gravitationally influenced body pivoted to said frame, and means for producing touch detectable vibrations controlled by relative angular relation of said gravitationally influenced body and frame for indicating the proper horizontal position of said frame relative to said gravitationally influenced body for correct observational measurement.

ROY A. OWENS.